Nov. 24, 1959 E. GORIN ET AL 2,914,596
SHAPED POROUS SEMI-CONDUCTING COMPOSITIONS
OF LITHIATED NICKEL OXIDE
Filed Jan. 17, 1958
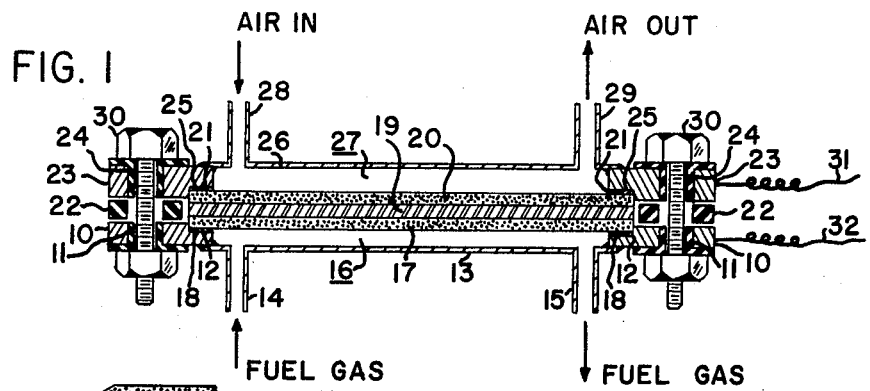
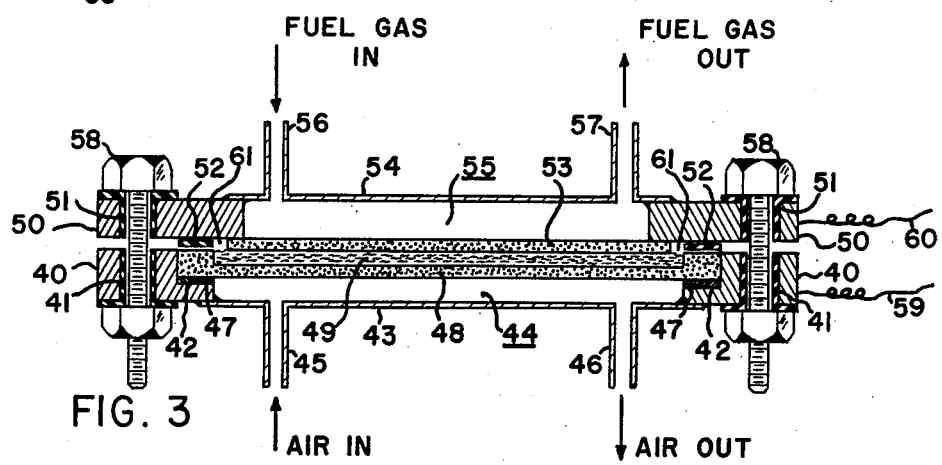
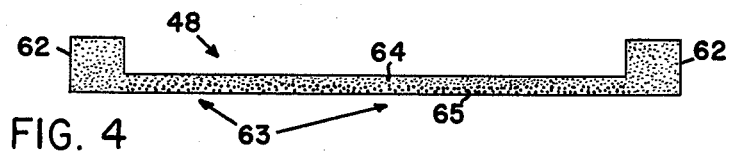
INVENTORS
EVERETT GORIN
HOWARD L. RECHT
BY
Harry B. Keck
ATTORNEY

United States Patent Office 2,914,596
Patented Nov. 24, 1959

2,914,596

SHAPED POROUS SEMI-CONDUCTING COMPOSITIONS OF LITHIATED NICKEL OXIDE

Everett Gorin and Howard L. Recht, Pittsburgh, Pa., assignors to Consolidation Coal Company, Pittsburgh, Pa., a corporation of Pennsylvania Application January 17, 1958, Serial No. 709,709

8 Claims. (Cl. 136—86)

The present invention relates to porous, semi-conducting compositions and a method for preparing them. More particularly, it relates to the use of such compositions as electrodes in high temperature gas combustion fuel cells.

High temperature gas combustion fuel cells have been proposed and developed to generate electricity from the electro-chemical reaction of combustible gas and air. Such cells are fully described in the literature, Gas Cell With Solid Electrolyte, Bull. Acad. Sci. USSR, Classe Sci. Tech., 215–218 (1946); Zeit. für Electrochemie 27, 199–208; ibid. 44, 727–32 (1957).

The present invention will be described with reference to the accompanying drawings in which:

Figure 1 is an illustration in cross-section of a typical high temperature fuel cell utilizing porous electrodes;

Figure 2 is a fragmentary perspective illustration of an alternative construction of an air electrode for use in a fuel cell;

Figure 3 is an illustration in cross-section of a high temperature fuel cell having double porosity electrodes without an electrolyte matrix; and Figure 4 is an illustration in cross-section of a double porosity air electrode suitable for use in the embodiment illustrated in Figure 3.

Referring to Figure 1, a fuel cell construction is indicated in cross-section. A bottom circular flange 10, preferably of stainless steel construction, has insulated bolt holes 11 about its periphery. A recess 12 is provided along the inner portion of the flange 10 to receive the electrodes and electrolyte as will be described. A gas chamber outer casing 13 is welded to the flange 10 to provide a fuel gas chamber 16. A fuel gas inlet conduit 14 and outlet conduit 15 are provided for introducing fuel gases into the fuel gas chamber 16 and recovering spent fuel gases therefrom.

A fuel gas electrode 17, in the form of a flat circular disc, fits into the recess 12 of the flange 10. A silver gasket 18 is provided between the fuel gas electrode 17 and the recess 12 to provide good electrical contact. A "solid" electrolyte disc 19 is placed on top of the fuel gas electrode 17. An air electrode 20, in the form of a flat circular disc, is placed above the "solid" electrolyte disc 19. A silver gasket 21 is placed above the air electrode 20. Electrical insulators 22 are provided above the flange 10 adjacent to the bolt holes 11.

A second circular flange 23, preferably of stainless steel, similarly is provided with insulated bolt holes 24 along its outer periphery in corresponding relation with the insulated bolt holes 11 of the flange 10. The flange 23 has a recess 25 for receiving the air electrodes 20. An air chamber outer casing 26 is welded to the upper surface of the flange 23 to provide an air chamber 27. An air inlet conduit 28 is provided to introduce oxygen-containing gases into the air chamber 27. A second conduit 29 is provided for removing oxygen-depleted air from the air chamber 27. Bolts 30 extend through the insulated bolt holes 24 and 11 to secure the assembled fuel cell. The flanges 10 and 23 are electrically insulated from each other.

The "solid" electrolyte 19 comprises a thin plate of porous refractory material impregnated with an oxygen-transferring electrolyte. Suitably the electrolyte is sodium carbonate. Small quantities of lithium carbonate may be added to the electrolyte if desired. The porous refractory matrix suitably is magnesium oxide. The matrix is soaked in molten carbonate to form the "solid" electrolyte. During operation of the high temperature fuel cell, the carbonate is in a molten condition.

The air electrode 20 comprises a thin porous plate of electron-conducting material such as micrometallic stainless steel. The fuel gas electrode 17 comprises a thin porous plate of electron-conducting material such as micrometallic iron or nickel or metal gauze. An activator coating frequently is provided over either or both of the electrodes 17 and 20 to promote fuel cell reaction. Iron or nickel powder may be used as activators at the fuel gas electrodes while the oxides may be used at the air electrode.

The two electrodes 17 and 20 are electrically insulated from each other. A gas tight separation is provided between the air chamber 27 and the fuel gas chamber 12.

The air electrode 20 is a positive electrode electrically joined to a positive bus bar by a conductor 31. The fuel gas electrode 17 is a negative electrode electrically connected to a negative bus bar by a conductor 32.

The simplified air electrode reaction involves conversion of oxygen gas into oxide ion

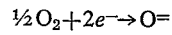
$$\tfrac{1}{2}O_2 + 2e^- \rightarrow O^=$$

If the "solid" electrolyte be considered as comprised of sodium carbonate, the sodium ion carries the current by migrating to the air electrode where it neutralizes the oxide ion

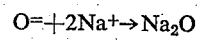
$$O^= + 2Na^+ \rightarrow Na_2O$$

The simplified fuel gas electrode reaction involves conversion of the carbonate ion into carbon dioxide and an oxide ion.

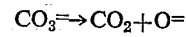
$$CO_3^= \rightarrow CO_2 + O^=$$

Fuel gas combines with the available oxide ion. If carbon monoxide is assumed as the fuel gas,

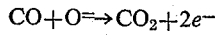
$$CO + O^= \rightarrow CO_2 + 2e^-$$

Thus a net flow of electrons through an external electrical circuit can be achieved from the fuel gas electrode 17 to the air electrode 20.

To avoid the phenomenon of concentration polarization, it is usually necessary to add a small quantity of carbon dioxide into the air chamber 27. The added carbon dioxide prevents accumulation of sodium oxide near the air electrode 20 by the reaction

$$Na_2O + CO_2 \rightarrow Na_2CO_3$$

The high temperature fuel cells of the prior art have, for the most part, utilized fuel gas and air electrodes (corresponding to the elements 17 and 20 of Figure 1) comprised of metallic wire gauze or perforated metal plates. Difficulties have been encountered in obtaining a high area of contact between electrodes of this type and the "solid" electrolyte (corresponding to the element 19 in Figure 1). Poor contact has severely limited the power output of prior art fuel cells. In addition, corrosion of the air electrode 20 has imposed severe limitations on the life of the prior art fuel cells.

Porous, micrometallic electrodes, particularly nickel, have been utilized in hydrogen-oxygen fuel cells operated at high pressures and medium temperatures. (F. T. Bacon, Beama Journal, 61, 6–12, 1954; British Patent 667,298, 1952; British Patent 725,661, 1955.)

Extremely high power outputs have been obtained with this type of construction.

In adapting the micrometallic type of electrode to the high temperature fuel cell, we have obtained, as expected, a higher power output than previously achieved. The corrosion observed on the air electrode, however, was excessive. A practical cell life could not be achieved.

It is an object of the present invention to provide a corrosion resistant porous electrode and a method for fabricating the same.

The present invention is concerned with the construction of the air electrode 20. The air electrode 20 is exposed to severe corrosion conditions during operation of the fuel cell, especially at temperatures about 800° C. The "solid" electrolyte 19 frequently is an alkali metal carbonate. The presence of an alkali metal carbonate at elevated temperatures in an oxidizing environment results in strongly corrosive conditions. In fact, even platinum electrodes experience corrosive attack as air electrodes.

The air electrode 20 must have the following properties:

(a) The air electrode must facilitate and catalyze the air electrode reaction with a low energy of activation.

(b) The air electrode must be an electron conductor.

(c) The air electrode should possess substantial surface area since the electrode reaction occurs at or near a surface.

(d) The air electrode should possess high porosity on the gas side to provide easy access of the oxidizing gases.

(e) The air electrode should be relatively easy to fabricate and should possess suitable mechanical strength.

According to the present invention, we have found that a lithiated nickel oxide porous sinter which possesses valency semi-conductor properties satisfies the requirements for the air electrode and, in addition, resists the corrosive environment in which it is used.

Incorporation of lithium oxide into a nickel oxide crystalline structure introduces valency semi-conductor properties in the resulting material. See "Semi-Conducting Materials," Butterworth Scientific Publication Ltd., London, 1951, pages 151–161. The conductivity of the resulting material desirably increases with temperature. From about $1/10$ to 10 atoms of lithium are provided for each 100 atoms of nickel in the composition.

The desired porous structure is obtained by sintering particles of lithiated nickel oxide which have been prepressed with a binder to the desired geometrical shape.

The uniform porosity shaped sinter may be prepared as follows:

Nickel oxide powder substantially free of impurities is added to a solution of lithium nitrate in a liquid solvent, preferably water. While lithium nitrate is preferred, any soluble lithium salt may be employed which is thermally decomposable to lithium oxide. The water solution should contain from about $1/10$ to 10 atoms of lithium per 100 atoms of nickel. The nickel oxide powder forms a slurry in the lithium nitrate solution. The water is evaporated while the slurry is being stirred. The remaining dried powder is calcined to decompose the lithium nitrate, leaving behind a residue of lithium oxide dispersed throughout the nickel oxide. Calcining at about 1000–1300° C. for several hours is satisfactory. The calcined powder may become somewhat agglomerated during the calcining treatment. The original green nickel oxide powder turns black during the calcining treatment. The black color is associated with the presence of trivalent nickel formed when the lithium is introduced into the crystalline structure.

The micro-porosity of the lithiated nickel oxide following calcining is high. To eliminate the micro-porosity, the agglomerates are crushed to pass through a 65 mesh Tyler Standard screen (for example) and poured into a solution of binder wax. Ceresin or carnauba wax are suitable when dissolved in a sufficient solvent such as benzene. About 1 to 5 percent by weight of wax is added to the crushed agglomerates in this manner. The solution is evaporated under continuous agitation to produce a wax coated powder. Any lumps are broken. The wax coated powder is mechanically pressed into a dense form of any desired shape at room temperature to bring the particles of lithiated nickel oxide powder into contiguity. The shaped object thereafter is calcined at about 1400–1600° C. for several hours. The wax binder burns and vaporizes leaving behind the compressed particles of lithiated nickel oxide. The lithiated nickel oxide in the resulting calcined shaped object has lost its microporous structure.

The shaped object is crushed and screened. A narrowly screened fraction is selected for preparation of the desired electrode. For general purposes, we prefer to employ that screened fraction which passes through a 48 mesh Tyler Standard screen and is retained on a 65 mesh Tyler Standard screen. Relative uniformity of individual particle sizes promotes the creation of large uniform size pores and a high porosity. Where smaller pores are desired, a relatively finer narrowly screened fraction may be selected, e.g., those particles which pass through a 200 mesh Tyler Standard screen.

The desired narrowly screened fraction is added to a solvent solution of binder (such as wax) as before. About 5 percent of the wax is desirable for the relatively large size screened fraction. With relatively finer screened fractions, less wax should be used.

| Size of screened fraction of calcined lithiated nickel oxide | | Binder content of sinter mixture percent by weight |
|---|---|---|
| Through screen size | Retained on screen size | |
| 48 | 65 | 5 or more. |
| 65 | 100 | About 5. |
| 100 | 200 | 2–4. |
| 200 | ------ | About 2. |

The binder solvent is evaporated under agitation. The resulting binder coated particles are poured into a mold slightly larger than the desired electrode shape. The mold may be a disc, a cup, a rectangular plate, et cetera depending upon the geometrical construction of the fuel cell proper. The powder is pressed into the desired mold at high mechanical pressures, for example, 5000 to 10,000 p.s.i. Preferably, the electrode will be as thin as mechanical requirements permit. Suitable air electrodes have been prepared with $1/16$ inch thickness in circular disc form.

The pressed powder is removed from the mold and fired at a temperature of 1400–1600° C. for several hours until satisfactory mechanical strength is achieved. In general, about 8 to 12 hours of firing is satisfactory. During the firing operation, the wax binder volatilizes or burns out, leaving behind a ceramic matrix of lithiated nickel oxide.

Elimination of the microporosity by the preliminary calcining treatment permits rigid control over the porosity of the final sinter. The porosity is affected by the selected screened fraction of calcined lithiated nickel oxide. To some extent, the quantity of binder and the intensity of mechanical pressing also affect the porosity. The fired molded electrode can be ground or shaped into the exact dimensions desired.

Improved fuel cell operating characteristics can be achieved by employing double porosity electrodes for both the air electrode 20 and the fuel gas electrode 17. A double porosity electrode possesses a fine pore structure on the surface in contact with the "solid" electrolyte 19 and a larger pore structure on the surface exposed to the air chamber 20 or fuel gas chamber 16. The fine pore structure serves to confine the "solid" electrolyte 19 and improve the electrode reaction. The larger pore structure provides freer access of the fuel cell gases to the zone of reaction.

A fragmentary perspective illustration of a double porosity electrode is presented in Figure 2. The fine porosity layer 33 would be placed in contact with the "solid" electrolyte of the fuel cell. The larger pore layer 34 would be exposed to the air passageway.

The double porosity air electrode can be prepared from the calcined lithiated nickel oxide already described. The fine pore structure portion is prepared from a fine screen fraction coated with binder. The larger pore structure is prepared from a coarser screen fraction coated with binder. One of the coated fractions is placed in the desired mold and lightly pressed. The second coated fraction thereafter is added to the mold and final mechanical pressing of the two layers is completed. By employing less binder with the relatively fine screen fraction than with the relatively coarse screen fraction, uniformity of shrinkage can be achieved during the final firing. The resulting double porosity electrode has a homogeneous matrix.

Employment of the double porosity electrode fabrication for both the air electrode and the fuel gas electrode permits construction of a fuel cell in which the matrix of the "solid" electrolyte can be eliminated. Only the electrolyte itself, in molten condition, separates the two electrodes. Improved electrical contact can be achieved. Such a construction is illustrated in Figure 3.

As illustrated in Figure 3, a high temperature fuel cell can be constructed without the inclusion of a refractory matrix in the electrolyte element.

A bottom circular flange 40, preferably of stainless steel, is provided with insulated bolt holes 41 and a recessed inner portion 42 for receiving an air electrode 48 constructed according to the present invention. An air chamber outer casing 43, preferably a stainless steel sheet, is welded to the bottom flange 40 to provide an air chamber 44. An air inlet conduit 45 and air outlet conduit 46 are provided. A silver gasket 47 rests within the recess portion 42.

A cup-shaped air electrode 48 fits into the recess portion 42. The air electrode 48 is fabricated to possess a depression in its upper surface for confining molten (at operating temperatures) electrolyte 49.

An upper circular flange 50 is provided with insulated bolt holes 51 along its periphery. An electrically insulating spacer gasket 52 is provided for separating the upper flange 50 from the periphery of the air electrode 48. The upper flange has fastened thereto along its bottom face a thin micrometallic nickel plate which comprises the fuel gas electrode 53. A fuel gas chamber outer casing 54 is welded to the upper face of the flange 50 providing a fuel gas chamber 55. A fuel gas inlet conduit 56 and a fuel gas outlet conduit 57 are provided.

Bolts 58 are provided through the insulated bolt holes 51 and 41 to secure the assembly. The bolts 58 are completely insulated from electrical contact with either of the flanges 40 or 50. The insulating spacer 52 is of such thickness that the fuel gas electrode 53 is maintained out of contact with the air electrode 48.

At operating temperatures the "solid" electrolyte 49 melts and is absorbed by capillary action into each of the electrodes 48 and 53.

The gas pressure in the air chamber 44 is maintained at about the same value as the fuel gas pressure in the fuel gas chamber 55 to avoid mechanical stress on the fuel cell elements.

The two electrodes 48 and 53 are electrically insulated from each other. The air electrode 48 is a positive electrode electrically joined to a positive bus bar by a conductor 59. The fuel gas electrode 53 is a negative electrode electrically connected to a negative bus bar by a conductor 60. A gas tight separation is provided between the air chamber 44 and the fuel gas chamber 55.

In the embodiment illustrated in Figure 3, the electrolyte is applied in a molten state into the cap portion of the air electrode 48. The electrolyte fuses. When the cell is assembled and heated to operating temperature, the electrolyte becomes molten once more and enters both electrodes through capillary action. A slight positive gas pressure is required in both of the gas chambers 44 and 55 to force the molten electrolyte back out of the electrodes 48 and 53. The molten electrolyte can rise into a small reservoir 61. The positive gas pressure should be the same in both gas chambers 44 and 55 to prevent mechanical stresses against the electrodes.

The double porosity construction of the air electrode 48 is preferable in fuel cells of the type illustrated in Figure 3. That portion of the air electrode 48 which is in contact with the molten electrolyte 49 would possess a relatively fine pore structure to confine the molten electrolyte. That portion of the air electrode 48 which is in contact with the air chamber 44 would have a relatively coarse pore structure to improve the accessibility of oxygen-containing gases to the zone of reaction.

Figure 4 is a cross-sectional illustration of an air electrode suitable for use in the embodiment shown in Figure 3. The air electrode 48 has an enlarged periphery 62 and a thin, flat center portion 63. There is a fine pored structure 64 including the enlarged periphery 62 and the upper surface of the thin, flat center portion 63. There is a coarse pored structure 65 including the bottom surface of the thin, flat center portion 63.

If desired, the fuel gas electrode 53 may similarly be constructed by the double porosity technique. Again the relatively fine pore structure would be in contact with the molten electrolyte 49 and the relatively coarse portion would be in contact with the fuel gas chamber 55.

EXAMPLES

I. *Conductivity measurements*

A number of air electrodes were prepared in accordance with the present invention. These electrodes were tested in a fuel cell environment to determine the conductivity properties of the air electrodes.

The air electrode being tested was positioned within a fuel cell structure substantially as shown in Figure 1. No fuel gas electrode or electrolyte was present. Hence the electrical current being tested (between the conductors 31 and 32) included the flange 10, the silver gasket 18, the air electrode 20, the silver gasket 21 and the flange 23.

By eliminating the air electrode and one of the silver gaskets 18 or 21, the conductivity contribution of the fuel cell supporting structure was determined.

This "blank" conductivity was measured first at 500° C., then at 810° C. and finally at 90° C. A small amount of corrosion occurred during the test which increased the contact residence somewhat. At 500° C., the measured "blank" resistance was 0.01 ohm. At 810° C. the measured "blank" resistance was 0.03 ohm. At 90° C., the measured "blank" resistance was 0.04 ohm. All conductivity measurements were carried out with a 60-cycle conductance bridge.

The following air electrodes were tested:

(A) An electrode was pressed from particles of lithiated nickel oxide ground to pass through a 200-mesh screen. Following calcining, a relatively fine-pored disc was shaped to the dimensions of the fuel cell supporting structure. The air electrode was assembled into the supporting structure as described.

Electrical resistance between the conductors 31 and 32 was measured at 800° C. with air on both sides of the electrode. The resistance was 0.08 ohm.

(B) An air electrode was pressed from particles of lithiated nickel oxide ground to pass through a 48 mesh screen yet retained on a 100 mesh screen. Following calcining, a relatively coarse pored disc was shaped to the dimensions of the fuel cell supporting structure. The air electrode was assembled into the supporting structure as described.

Electrical resistance between the conductors 31 and 32 was measured at 790° C. with air on both sides of the electrode. The resistance was 0.27 ohm.

When the structure was dismantled, visual inspection of the silver gaskets and the coarse-ground air electrode showed evidence of points of contact only at the surface grains. Thus a limited area of electric contact was available.

These examples demonstrate that satisfactory electrical conductivity is achieved according to the present invention. Where the relatively fine pored structure is employed at electrical junctures, the conductivity is excellent.

II. Fuel cell operation

An air electrode was prepared in accordance with this invention containing one atom of lithium for each 100 atoms of nickel.

Powdered nickel oxide was added to an aqueous solution of lithium nitrate. Water was evaporated and the dried slurry was heated to decompose the lithium nitrate. The calcined material was crushed and poured into a benzene solution of ceresin wax. The benzene was evaporated. The wax coated particles (5 percent wax) were pressed into a briquet at 10,000 p.s.i. mechanical pressure. The briquet was held at 1500° C. for 12 hours.

The calcined briquet had a diminished micropore structure. The briquet was crushed and screened. The material passing through a 48 mesh Tyler Standard screen and retained on a 100 mesh Tyler Standard screen was recovered and deposited in a benzene solution of ceresin wax. The benzene wax evaporated and the wax coated (5 percent wax) particles were placed in a disc mold. Mechanical pressure of 10,000 p.s.i. was applied. The resulting flat disc was fired at 1500° C. for 12 hours. The fired disc had a uniform pore structure and appeared to have shrunk in a uniform manner. The disc was sanded to a flat surface with a diameter of 3.26 cm. and a thickness of about 0.4 cm.

The "solid" electrolyte was a porous block of calcined magnesium oxide which had been saturated with molten $NaLiCO_3$. The fuel gas electrode was a micrometallic disc of nickel having a diameter of 3.0 cm. and a thickness of 0.2 cm.

The fuel cell was assembled as shown in Figure 1 and maintained at 700° C. for 3 days. The fuel gas was hydrogen gas containing about 3 percent moisture. About 10 percent of carbon dioxide was added to the air in the air chamber.

On the first day, a maximum open circuit voltage of 1.240 volts was recorded. During the first day, electrical current was drawn from the fuel cell for four periods of thirty minutes each as follows:

| Current (milliamperes): | Terminal voltage (volts) |
| --- | --- |
| 100 | 1.055 |
| 250 | 0.823 |
| 250 | 0.855 |
| 500 | 0.500 |

On the second day, a maximum open circuit voltage of 1.245 volts was recorded. During the second day, electrical current was drawn from the fuel cell for four periods of thirty minutes each as follows:

| Current (milliamperes): | Terminal voltage (volts) |
| --- | --- |
| 250 | 0.812 |
| 500 | 0.420 |
| 250 | 0.823 |
| 500 | 0.403 |

On the third day, a maximum open circuit voltage of 1.240 volts was recorded. During the third day a current of 250 milliamperes was drawn for a period of five hours. Terminal voltage during this five-hour current drain was as follows:

| Time (from beginning): | Terminal voltage (volts) |
| --- | --- |
| ½ hour | 0.770 |
| 1 hour | 0.770 |
| 2 hours | 0.800 |
| 4 hours | 0.783 |
| 5 hours | 0.800 |

Thereafter on the third day, a current of 100 milliamperes was drawn for a thirty-minute period at a terminal voltage of 1.055 volts.

Thus electrical power was generated in a fuel cell embodying an air electrode prepared according to the present invention. Following the third day, inspection of the air electrode revealed no detectable corrosion.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. An electrode for a high temperature gas combustion fuel cell consisting essentially of a ceramic body comprising porous lithiated nickel oxide.

2. An electrode for a high temperature gas combustion fuel cell consisting essentially of porous lithiated nickel oxide containing $\frac{1}{10}$ to 10 atoms of lithium for each atom of nickel.

3. An electrode for a high temperature gas combustion fuel cell consisting essentially of a substantially homogeneous semi-conducting porous composition of lithiated nickel oxide formed in two layers, each having a uniform but different porosity.

4. An electrode for a high temperature gas combustion fuel cell consisting essentially of a substantially homogeneous semi-conducting porous composition of lithiated nickel oxide formed in two layers, each having a uniform but different porosity, and an electrical junction associated with that layer of relatively low porosity.

5. A high temperature gas combustion fuel cell comprising a porous nickel fuel gas electrode spaced apart from an air electrode consisting essentially of a substantially homogeneous semi-conducting porous composition of lithiated nickel oxide, a molten electrolyte containing sodium and carbonate ions between the two electrodes, means for introducing oxygen-containing gas to said air electrode, means for introducing fuel gas to said fuel gas electrode, and electrical conducting means associated with said eelctrodes for withdrawing electrical power.

6. The method of fabricating a shaped semi-conductor of lithiated nickel oxide having uniform porosity which comprises admixing powdered nickel oxide with a liquid solution of a soluble lithium salt yielding lithium oxide on thermal treatment, heating the resulting slurry to evaporate the liquid and convert the lithium salt to lithium oxide, crushing the lithiated nickel oxide and coating the particles with an organic binder, mechanically pressing the coated particles into a shaped form to bring the oxide particles into contiguity, heating said shaped form to volatilize and eliminate said binder and to fuse the lithiated nickel oxide into a calcined form having a diminished microporous structure, crushing the calcined form, coating a narrowly defined particle size fraction thereof with an organic binder, mechanically pressing the coated particles to the desired shape, and firing the pressed shape to volatilize the binder and fuse the shape.

7. The method of fabricating a shaped semi-conductor of lithiated nickel oxide having uniform porosity which comprises admixing powdered nickel oxide with an aqueous solution of lithium nitrate containing $\frac{1}{10}$ to 10 atoms of lithium for each atom of nickel, heating the resulting slurry to evaporate the water and convert the lithium nitrate to lithium oxide, crushing the lithiated nickel oxide into a solution of an organic binder, evaporating the solvent to produce a residue of lithiated nickel oxide particles coated with said organic ibnder, mechanically pressing the coated particles into a shaped form to bring the oxide particles into contiguity, heating said shaped form to volatilize and eliminate said binder and to fuse the lithiated nickel oxide into a calcined form having a diminished microporous structure, crushing the calcined form, screening the crushed form to obtain a narrowly defined particle size fraction thereof, adding said fraction to a solution of organic binder, evaporating the solvent to produce a residue of substantially uniform size particles of lithiated nickel oxide coated with said organic binder, mechanically pressing the coated particles to the desired shape, and firing the pressed shape to volatiilze the binder and fuse the shape.

8. The method of fabricating a shaped semi-conductor of lithiated nickel oxide having double porosity which comprises admixing powdered nickel oxide with a liquid solution of a soluble lithium salt yielding lithium oxide on thermal treatment, heating the resulting slurry to evaporate the liquid and convert the lithium salt to lithium oxide, crushing the lithiated nickel oxide and coating the particles with an organic binder, mechanically pressing the coated particles into a shaped form to bring the oxide particles into contiguity, heating said shaped form to volatilize and eliminate said binder and to fuse the lithiated nickel oxide into a calcined form having a diminished microporous structure, crushing the calcined form, coating two different narrowly defined particle size fractions thereof separately with an organic binder, mechanically pressing one fraction of the coated particles into a mold of the desired shape to fill a portion of the mold, thereafter mechanically pressing the other fraction of the coated particles into the same partially filled mold, and firing the pressed shape to volatilize the binder and fuse the shape.

References Cited in the file of this patent

FOREIGN PATENTS

| | | |
|---|---|---|
| 667,298 | Great Britain | Feb. 27, 1952 |
| 725,661 | Great Britain | Mar. 9, 1955 |